US010745097B2

United States Patent
Lippincott et al.

(10) Patent No.: US 10,745,097 B2
(45) Date of Patent: Aug. 18, 2020

(54) INFLATABLE LIFTING-BODY KITE

(71) Applicants: Mathew W. Lippincott, Portland, OR (US); Charles M. Willard, Mocksville, NC (US)

(72) Inventors: Mathew W. Lippincott, Portland, OR (US); Charles M. Willard, Mocksville, NC (US)

(73) Assignee: Head Full of Air LLC, Portland, OR (US)

(*) Notice: Subject to any disclaimer, the term of this patent is extended or adjusted under 35 U.S.C. 154(b) by 330 days.

(21) Appl. No.: 15/981,793

(22) Filed: May 16, 2018

(65) Prior Publication Data

US 2019/0351989 A1 Nov. 21, 2019

(51) Int. Cl.
*B64B 1/42* (2006.01)
*B64B 1/50* (2006.01)
*B64B 1/64* (2006.01)

(52) U.S. Cl.
CPC ............... *B64B 1/42* (2013.01); *B64B 1/50* (2013.01); *B64B 1/64* (2013.01)

(58) Field of Classification Search
CPC .... B64C 1/42; B64C 1/50; B64C 1/40; B64C 1/02; B64C 1/00
USPC .......................................................... 244/33
See application file for complete search history.

(56) References Cited

U.S. PATENT DOCUMENTS

| | | | | | |
|---|---|---|---|---|---|
| 2,398,745 | A | * | 4/1946 | Jalbert | B64B 1/40 244/33 |
| 2,888,675 | A | * | 5/1959 | Pratt | H01Q 15/20 342/8 |
| 3,311,328 | A | * | 3/1967 | Slater | B64B 1/58 244/31 |
| 3,369,774 | A | * | 2/1968 | Struble, Jr. | B64B 1/58 244/31 |
| 4,120,259 | A | * | 10/1978 | Wilson | F41J 2/00 116/210 |
| 4,125,233 | A | * | 11/1978 | Winker | B64B 1/42 244/126 |
| 4,533,099 | A | * | 8/1985 | Stewart | A63H 27/085 244/153 R |
| 4,787,575 | A | * | 11/1988 | Stewart | B64B 1/50 116/210 |
| 4,919,365 | A | * | 4/1990 | Mears | A63H 27/085 116/210 |
| 5,104,059 | A | * | 4/1992 | Rand | B64B 1/42 244/126 |
| 5,470,032 | A | * | 11/1995 | Williams, Jr. | B64B 1/50 244/1 TD |

(Continued)

FOREIGN PATENT DOCUMENTS

| | | | | |
|---|---|---|---|---|
| EP | 2719719 A1 | * | 4/2014 | ............... B64B 1/58 |
| FR | 2981330 A1 | * | 4/2013 | ............. G09F 21/06 |

(Continued)

*Primary Examiner* — Christopher P Ellis
(74) *Attorney, Agent, or Firm* — Mersenne Law

(57) ABSTRACT

Kites having an inflatable lifting-body shape with side wings or keels and a horizontal stabilizer or tail to control the angle of attack of the lifting body can be constructed efficiently and economically through a process that builds a laminate of flat sheets, then cuts and joins the sheets to produce an inflatable envelope. Other pieces are affixed to the envelope to produce a finished kite.

19 Claims, 9 Drawing Sheets

(56) References Cited

U.S. PATENT DOCUMENTS

| | | | | | |
|---|---|---|---|---|---|
| 8,066,225 | B1* | 11/2011 | Tigner | ............... | F03D 5/00 244/153 R |
| 8,167,246 | B1* | 5/2012 | Mears | ............... | G09F 21/06 244/153 R |
| 8,616,111 | B2* | 12/2013 | Simpson | ............... | A61M 25/10 87/11 |
| 9,321,518 | B1* | 4/2016 | Rabbino | ............... | B64B 1/50 |
| 2002/0069750 | A1* | 6/2002 | Uchida | ............... | D04C 3/48 87/33 |
| 2004/0021037 | A1* | 2/2004 | Nachbar | ............... | B64B 1/58 244/125 |
| 2004/0200927 | A1* | 10/2004 | Swearingen | ............... | B64B 1/02 244/30 |
| 2005/0009439 | A1* | 1/2005 | Ahn | ............... | B64B 1/02 446/220 |
| 2006/0192048 | A1* | 8/2006 | Pedretti | ............... | B64B 1/08 244/24 |
| 2007/0267538 | A1* | 11/2007 | Luchsinger | ............... | B64B 1/50 244/33 |
| 2007/0281570 | A1* | 12/2007 | Liggett | ............... | B32B 5/26 442/378 |
| 2008/0290665 | A1* | 11/2008 | Potter | ............... | F03D 13/20 290/55 |
| 2014/0374537 | A1* | 12/2014 | Anderson | ............... | B64D 45/02 244/1 A |
| 2015/0246717 | A1* | 9/2015 | Fournier | ............... | B64D 37/30 244/30 |
| 2016/0083068 | A1* | 3/2016 | Crites | ............... | B64B 1/40 244/31 |
| 2017/0183073 | A1* | 6/2017 | Simonis | ............... | B64B 1/30 |
| 2018/0118320 | A1* | 5/2018 | Morehead | ............... | B64B 1/14 |
| 2018/0237141 | A1* | 8/2018 | Heppe | ............... | B64B 1/64 |

FOREIGN PATENT DOCUMENTS

| | | | | |
|---|---|---|---|---|
| WO | WO-0212060 A2 * | 2/2002 | ............... | B64B 1/04 |
| WO | WO-2017136568 A1 * | 8/2017 | ............... | B64B 1/50 |

* cited by examiner

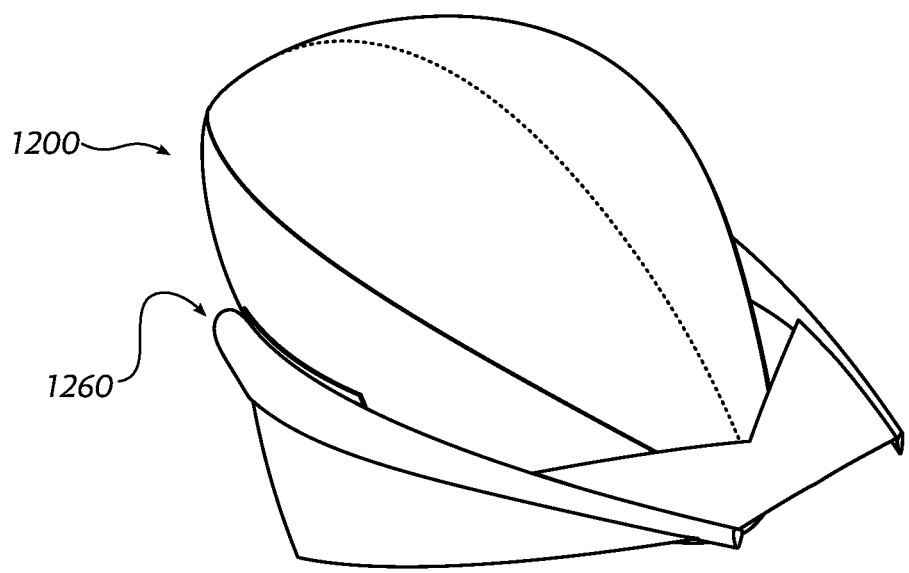
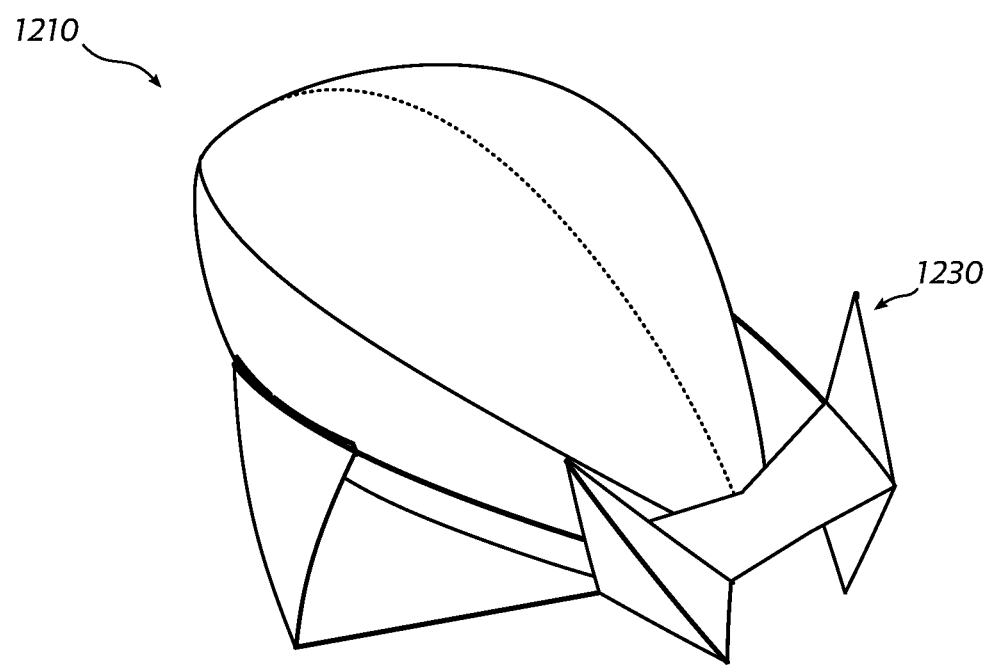
Fig. 12

INFLATABLE LIFTING-BODY KITE

CONTINUITY AND CLAIM OF PRIORITY

This is an original U.S. patent application.

FIELD

The invention relates to structures adapted to be completely or partially sustained by air. More specifically, the invention relates to buoyant devices or structures (balloons) attaining additional lift and stability through tension and the relative movement of the air (kites), known in practice as kite-balloons or tethered aerostats.

BACKGROUND

Kite balloons have been used for industrial, scientific, military, and advertising purposes since being reduced to practice by August von Parseval over a century ago, carrying people, weather instruments, radar, advertising signs, etc. Since the beginning, designers have experimented with varying levels of aerostatic and aerodynamic lift. Currently, development in the art focuses on three main aspects of kite balloons:

Envelope.

While a large variety of materials, configurations, and construction methods for kite balloons are known, only four envelope shapes have been widely experimented with, and only two are currently available commercially:
  (a) Cylindrical balloons (Parseval-type, see, e.g., U.S. Pat. No. 970,262). These were largely abandoned after the invention of (b).
  (b) Blimp-shaped balloons (Caquot and later, see e.g., U.S. Pat. No. 1,419,205), including most contemporary aerostats.
  (c) V-shaped balloons (NOAA's Dart balloon, Menke), were explored in the 1960's but largely abandoned due to poor aerostatic lift performance.
  (d) Lenticular, or oblate spheroid balloons (see, e.g., U.S. Pat. Nos. 4,919,365 and 5,065,163 to Arthur W. MEARS), which are successfully marketed by Skystar, Allsopp Helikite, and others.

Note that blimp-type aerostats have reduced performance at small sizes due to the unfavorable relationship of surface area to volume as size is reduced. Small kite balloons with more spherical blimp shapes are sometimes used (see, e.g., U.S. Pat. No. 1,377,924), and lenticular envelopes are generally preferred at smaller sizes (less than about 100 cu. ft.) because of their greater volume for a given surface area, increased kiting lift, and simplicity of fabrication. However, lenticular envelopes introduce known issues through their fore/aft symmetry and two-part pattern (see Kiting and Rigging, below.)

Envelope Fabrication.

The easiest way to make an air-tight seam is to seal it on a flat surface, and various schemes have been devised to construct balloon seams on flat surfaces in whole or part, singular or multiple. The simplest balloon patterns seal and cut the envelope with a single step on a flat surface (see, e.g., U.S. Pat. Nos. 1,625,394 and 4,290,763). Lenticular kite balloons in particular are simple to fabricate because a flat, circular pattern can be used.

Kiting.

In the early history of kite balloons, kiting—inclining the balloon into the wind to derive aerodynamic lift—was achieved by balancing the payload towards the rear of the balloon. In later and larger designs, the payload was balanced forward, around the bridle (see, e.g., U.S. Pat. Nos. 1,377,924 and 1,686,646) and towards the nose of the balloon to create a forward mass balance that automatically weather cocks.

A forward mass balance is possible because of the fore/aft asymmetry of the blimp balloon shape. Small blimp-shape kite balloons such as. Domina Jalbert's Kytoon (see, e.g., U.S. Pat. Nos. 2,398,744 and 2,398,745), an emergency radio buoy designed for life rafts (1940's-60's), and CNES's Aeroclipper (1990's-today) use kiting (see, e.g., U.S. Pat. No. 5,115,997) with a forward mass balance. Lenticular designs such as the Skystar and Allsopp Helikite (see, e.g., U.S. Pat. No. 6,016,991 to Gerald ALLSOPP, and U.K. Patent Application No. GB2,280,381A by the same inventor) with their fore/aft symmetry, must have a rearward mass balance if they are to maintain an appropriate flight angle when not under a wind load. The increased static lift and increased kiting surface provided by a lenticular envelope must be balanced against its negative characteristics for weathercocking.

Rigging.

One of the primary difficulties in operating a kite balloon is both bridle rigging and payload rigging. Multiple lines and systems to distribute stress constitute a significant portion of the fabrication work of a balloon and the long-term maintenance needed. Furthermore, adjusting and checking the symmetry of bridles are challenging tasks for even moderately trained users.

Keeled kites dominate the consumer kite market (e.g. Delta kites of the Rogallo design, e.g. U.S. Patent Nos.) because they do not need adjustment to maintain their stabilizing position. Simplified rigging increases the chance of successful flight by inexperienced kite fliers. Kite balloons with tether-tensioned keels requiring multiple bridle lines date from the Parseval device and were explored by Upson (U.S. Pat. Nos. 1,341,248 and 1,385,972) and Yamada, and others as a means of stability before being superseded by inflated and ram-air fins. Fixed keels have been explored by Mears and Allsopp, however their position is a departure from best practices.

Kite balloons are usually bridled around their horizontal centerline, which prevents rolling and distributes line tension into pressure along the envelope's major axis to resist wind force on the nose. The multi-gore pattern of a Blimp-type kite balloon separates the relatively weaker seams from mounting points for both stabilizers and rigging attachments around the envelope's horizontal centerline. On a two-part lenticular balloon, the seam and the distortion around it dominates the horizontal centerline, preventing stabilizers and rigging from being attached directly to the envelope in this area. Mears-type drag-net stabilizer balloons may use a system of restraining straps to place re-enforced rigging attachments around the envelope's center, while the Helikite uses a central keel for rigging and creates nose pressure and manages roll by other means.

Innovations combining simplified rigging around the horizontal center of a balloon with the simplified fabrication, volumetric efficiency, and aerodynamic lift of a lenticular balloon as well as the fore/aft asymmetry of a blimp-type balloon would provide significant value to the field of small kite balloons.

SUMMARY

The present patent application addresses the design and fabrication of small kite balloons devices (~1-1,000 cu. ft.

volume) where a low ratio of surface area to volume and substantial aerodynamic lift are desired. Through combined innovations in envelope design and fabrication, stabilization, and rigging, wind performance is increased for a given volume of gas while fabrication costs are decreased.

The fabrication advantage of a flat gas-tight seam is a favorable characteristic of lenticular envelope designs. In the present invention, a single-step flat pattern is described that makes use of three or more gores to produce less deformed, more aerodynamic, and more volume-efficient shapes than prior-art designs while retaining the favorable manufacturing characteristic of a flat, single-process pattern. Furthermore, fins and stabilization structures are designed to attach to the single-process pattern before or after seam sealing.

The present innovation diverges from other small kite balloons in having a vertically asymmetrical envelope pattern to more efficiently derive lift via its airfoil profile, an effect further enhanced by stabilization structures mounted off-axis from the envelope's major axis. Stabilizers direct air around the envelope to promote efficient, attached flow over the airfoil. Additional stability is achieved by bridling the balloon around its horizontal centerline.

The present innovation's use of double keels eliminates most bridle rigging while leaving the belly of the envelope open for direct payload attachment. Improved ease of use is obtained, as well as a forward mass balance and improved weathercocking.

BRIEF DESCRIPTION OF DRAWINGS

FIG. 12 shows additional features that may be part of an embodiment.

DETAILED DESCRIPTION

An embodiment of the invention is a tethered kite having a lifting-body shape that may be largely supported by inflation (either static or ram-air pressure). Orientation and angle-of-attack may be controlled economically and effectively by fins and/or keels, the support structures of which may also help support the balloon envelope. The simplest, least-expensive embodiment may be constructed of three panels or gores, which may be cut and assembled from a bulk sheet material in as little as a single manufacturing operation. The materials and techniques described herein are most useful in the design and fabrication of smaller devices (say, 1 to 1,000 cu. ft. in volume), where a low ratio of surface area to volume and substantial aerodynamic lift are desired. Through combined innovations in envelope design and fabrication, stabilization and rigging, wind performance is improved for a given envelope volume, while fabrication costs are decreased. These features are particularly beneficial for consumer-market products.

Figure 1:
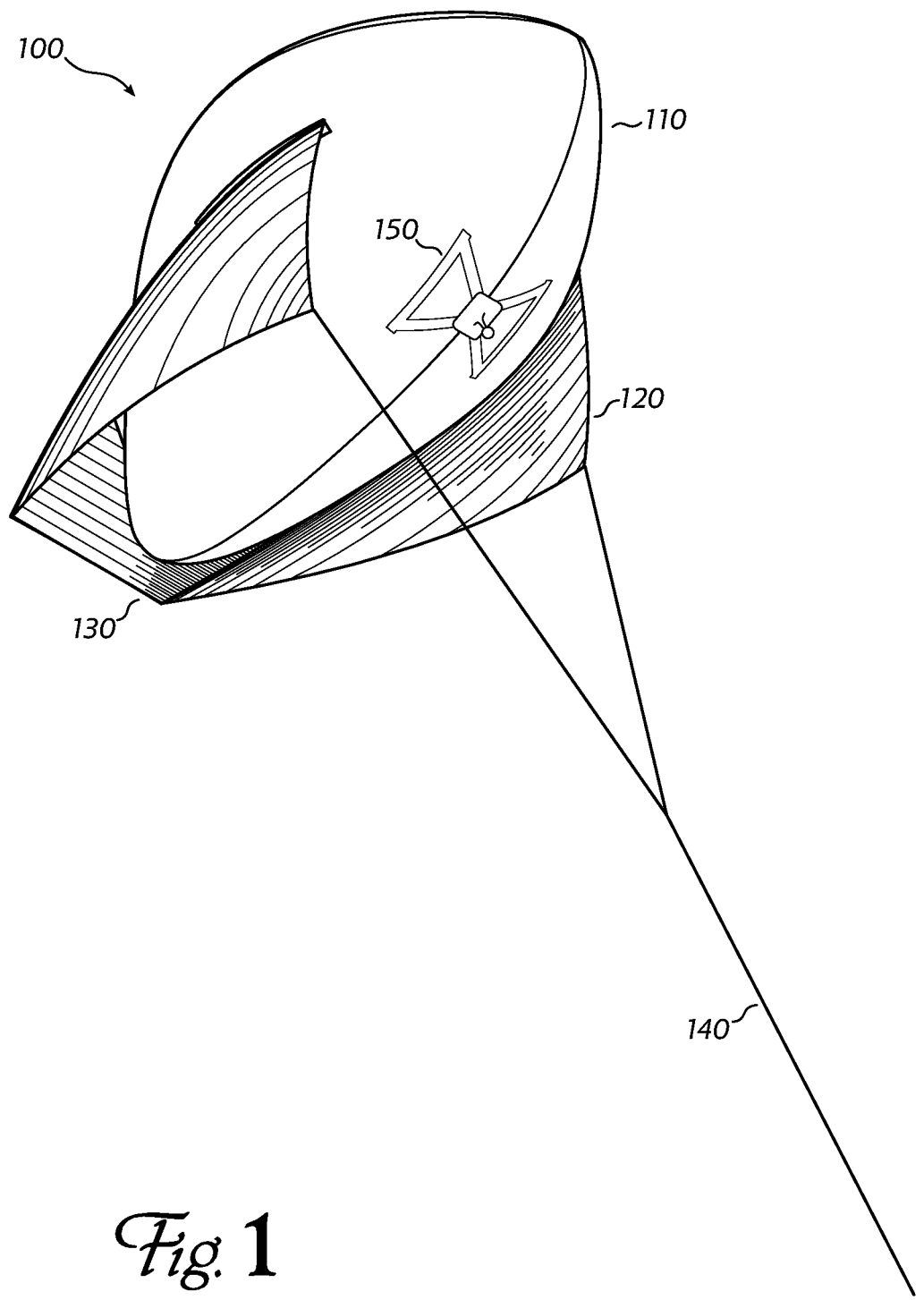
FIG. 1 shows a shaded isometric drawing of an embodiment of the invention.

FIG. 1 shows an isometric drawing of an embodiment 100. It comprises an inflatable envelope 110, side fins 120, and a tail stabilizer 130. The kite structure may be tethered by a bridle 140 attached to lower/leading edges of fins 120 (bridle may instead attach to the lower central portion of the envelope 110, or to a combination of attachment points). An embodiment may comprise accessories such as a load mount system 150. The shape of the envelope provides a favorable ratio of volume to surface area so that the embodiment can provide substantial lifting force even in light winds. No rigid structure is needed to support the envelope, so the embodiment is less complicated, less expensive, and more durable than a prior-art kite having similar lifting capability.

The inflatable-envelope portion of an embodiment may be constructed of a thin, durable and low-permeability (i.e., mostly- or completely-airtight) material such as thermoplastic polyurethane ("TPU") sheet, laminated polyester film (e.g. commercially-available "Mylar®"), or a lightweight woven fabric such as nylon or ripstop nylon (which may be coated to reduce its permeability). TPU or Mylar film around 0.002" in thickness offers a favorable combination of availability, durability, handling and low cost. Thicker films or woven material may be preferred for larger embodiments with higher lifting capability. For example, an embodiment with a 1,000-10,000 cu. ft. envelope might be made of 0.008" TPU film or rubberized/PVC-coated fabric. On the other hand, very small embodiments (e.g. 1-10 cu. ft.) can be made inexpensively from 0.0005" Mylar film.

Figure 2:
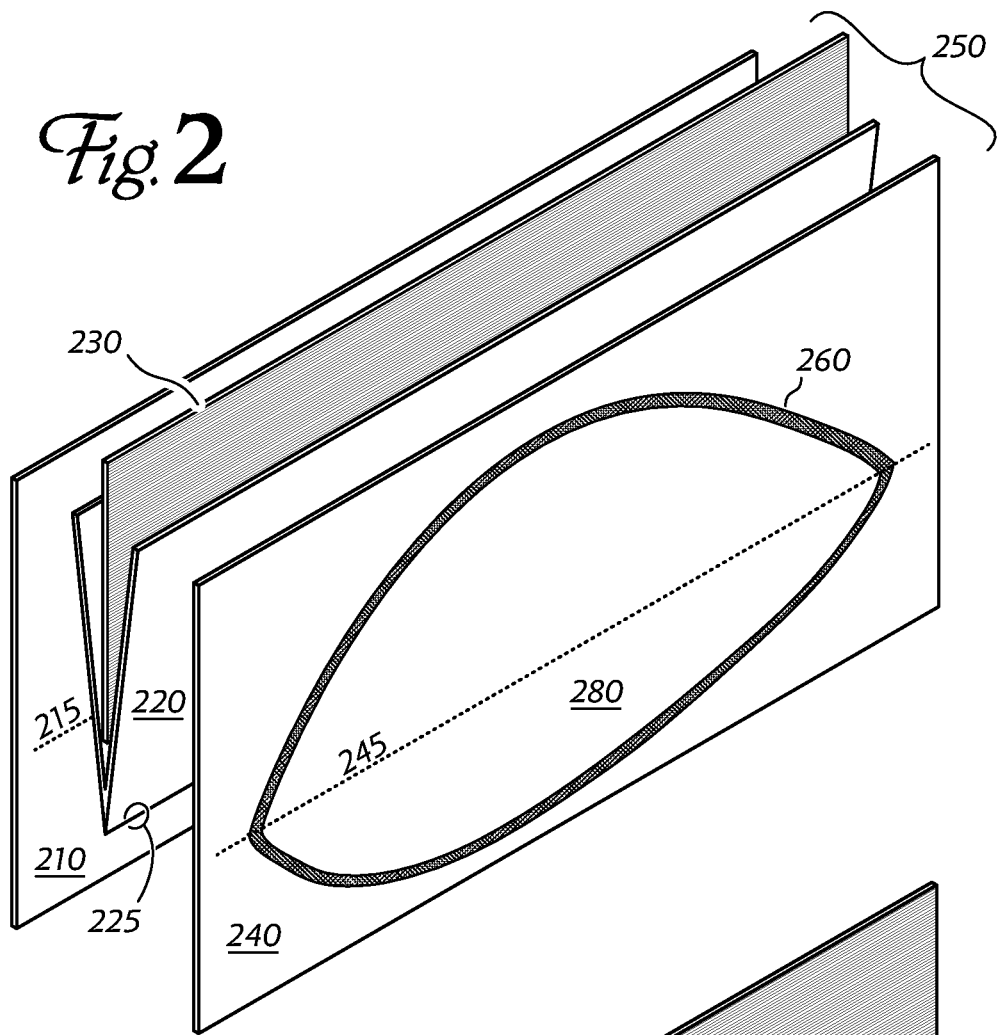
FIG. 2 shows a stack of material layers ("fabrication laminate") which may be prepared during a manufacturing process.

FIG. 2 illustrates material arrangement for an efficient manufacturing process described below. A first sheet of material 210 is spread out on a work surface, then a second sheet 220 is placed atop. The second sheet is folded in half, with the fold line 225 running across the work area. The two adjacent surfaces of the second, folded sheet are separated by a partition 230. Finally, a third sheet of material 240 is placed over the first and second sheets to form a multi-ply fabrication laminate 250. Dotted lines 215 and 245 indicates the location of fold line 225 across the outside sheets 210, 240 of the fabrication laminate 250.

Next, the envelope gores or panels are formed by cutting through the multi-ply fabrication laminate 250 around a shaped perimeter 260. The cutting process may simultaneously fuse, stitch, adhere or otherwise join adjacent layers together, forming seams as shown in the crosshatch area near 260. After cutting and seaming, the area marked 280 forms one panel or gore of the inflatable envelope of an embodiment.

Figure 3:
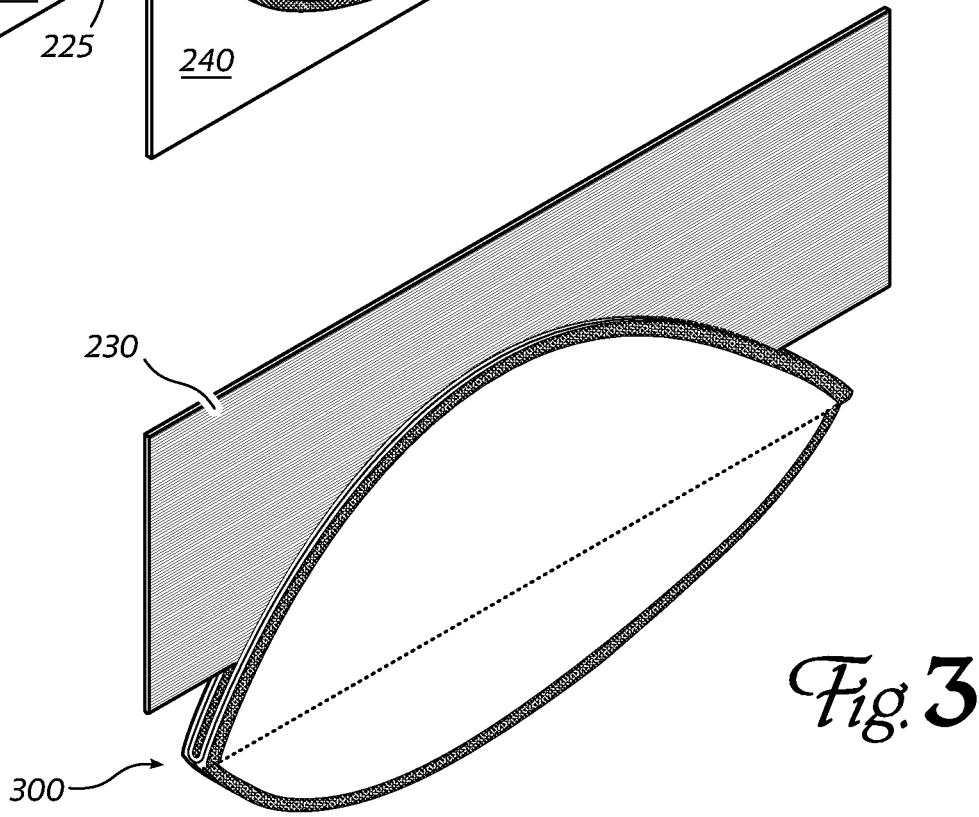
FIG. 3 shows the fabrication laminate after a manufacturing operation.

FIG. 3 shows the fabrication laminate after cutting and seaming. Excess sheet material has been removed, but partition 230 is still present. The inflatable envelope (generally at 300) is still flat. (Note that these figures exaggerate the thickness of each envelope layer for clarity—the actual laminate is quite thin.)

Figure 4:
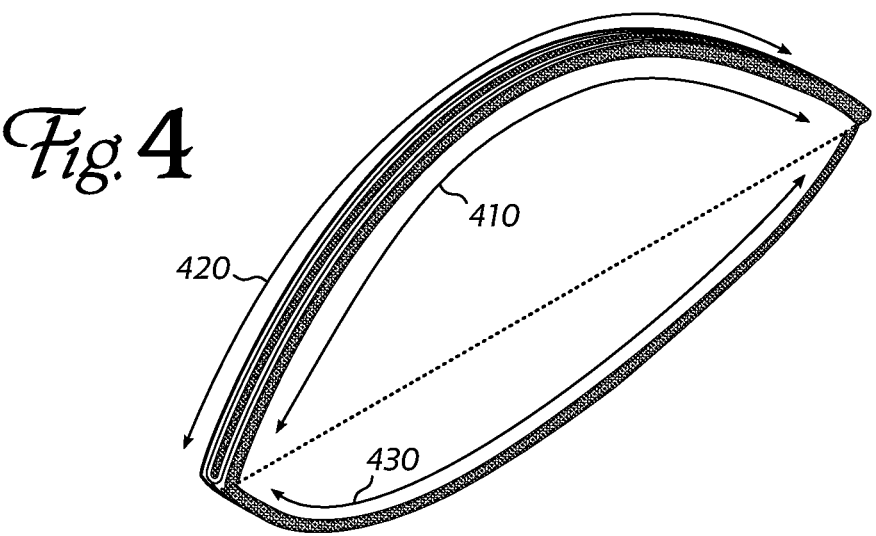
FIG. 4 shows further development of the fabrication laminate.
Figure 5:
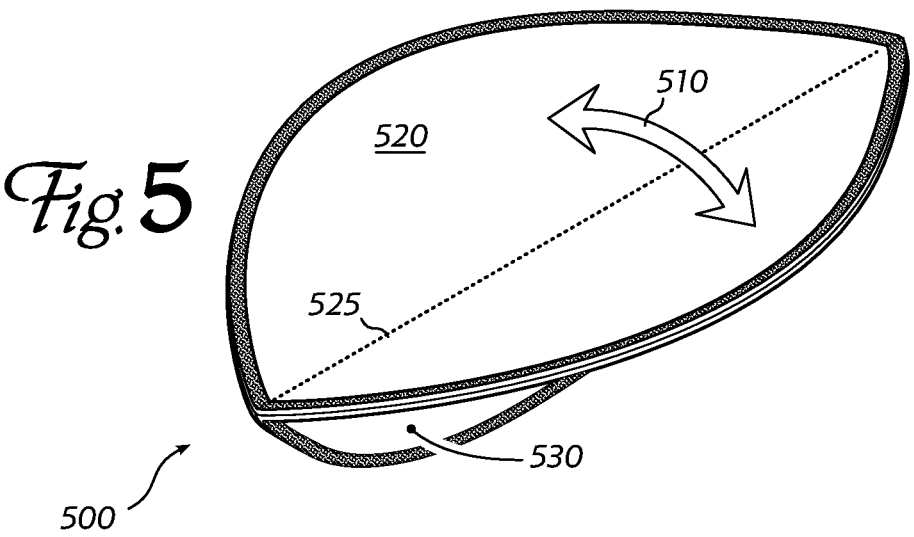
FIG. 5 shows the result of manipulating the fabrication laminate to expose additional structural details.
Figure 6:
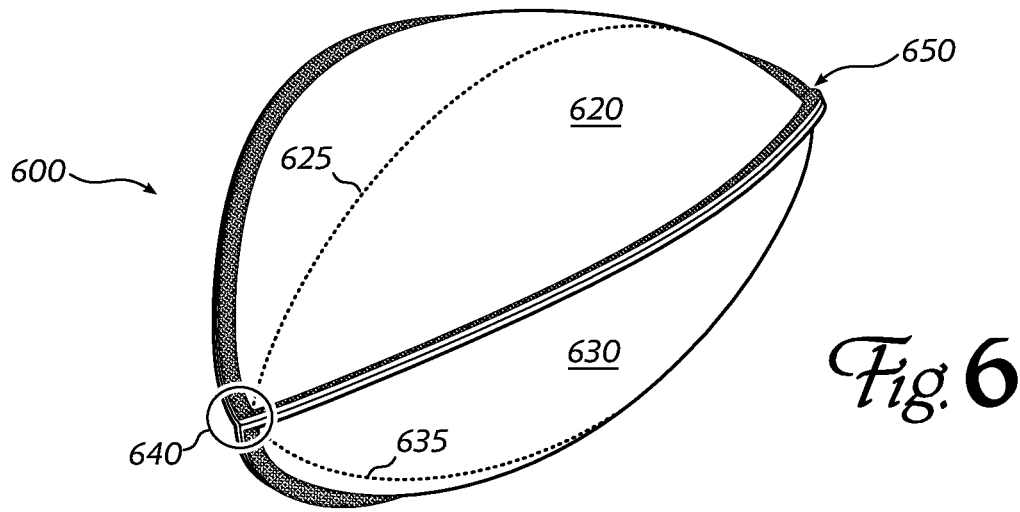
FIG. 6 shows how the fabrication laminate can be inflated to form a portion of an embodiment.

FIGS. 4-6 show further progression of a preferred manufacturing process. In FIG. 4, the partition has been removed, exposing the two separate top seams 410 and 420, which each join about half of the perimeter of the outside sheets (210, 240) to a corresponding half of the perimeter of the middle, folded sheet 220. Along another portion of the perimeters of the outside sheets, the outside sheets are joined to each other to form a central belly seam 430. The two side panels (the outside layers of the fabrication matrix) are identically-shaped (or, if the sheet material is considered to have obverse and reverse sides [inside and outside], then they are mirror images of each other). When the envelope is flat and uninflated, as shown here, the side panels are asymmetrical and somewhat lenticular shaped, although this shape is not the same as the lifting-body shape of the inflated envelope.

Turning to FIG. 5, the top seams (410 and 420 in FIG. 4) have been separated 510 to show that the envelope (generally 500) has three faces: a bilaterally-symmetric top panel 520 (525 marks the axis of symmetry that corresponds to fold line 225 mentioned earlier); a left-side face 530, only a small portion of which is visible; and a right-side face that is not visible in this view. The "flaps" of an embodiment can be bent or folded so that any two of them are flat, and but for such fold, each panel or gore is a substantially flat or planar surface. The bilaterally-symmetric lenticular shape of the top panel is different from the asymmetric side-panel shapes, and also different from the lifting-body shape of the inflated envelope (see FIG. 6.)

Finally, FIG. 6 shows the envelope (generally 600) after inflation, which may be accomplished via a valve installed during the cutting and sealing process, or by a ram-air system described below. The top panel 620 expands out and up (its axis of symmetry 625 traces the top centerline of the envelope). More of right side panel 630 is visible, and 635 shows where fold line 225 lay when the fabrication laminate was flat and uninflated. Generally speaking, inflation causes the panels or gores to develop a convex surface profile. Or, more precisely, when the internal pressure inside the envelope exceeds ambient pressure, the panels bulge out to become convex. Two additional points of interest are identified in this Figure: the point at which the three panels come together at the front of the envelope (the "nose") at 640 and the corresponding junction point at the back of the envelope (the "tail") at 650.

It is appreciated that opening and inflating the envelope as shown here will distort the inter-panel seams, so they will usually wrinkle. This does not significantly affect the aerodynamic performance of the envelope, though, and wrinkling can be reduced by using an elastic sheet material such as TPU rather than a polyester film (which is highly flexible out-of-plane, but highly resistant to in-plane stretching). However, more-rigid sheet materials may be tougher or more durable than elastic materials. In general, choice of a suitable material is within the sound engineering judgement of one of ordinary skill in the art. Again, note that the thickness of layers and width of seams has been exaggerated for illustrative clarity. An embodiment may have narrower seams, and the envelope may even be everted to move the seams inside, so that the excess material of the seam cannot be seen.

It should further be noted that improved envelope-shape control can be obtained by using a larger number of gores or panels, so that (for example) some or all of the three panels shown in FIGS. 2-6 comprises a plurality of sub-panels. Even if each sub-panel is planar, they may be assembled so that the supra-panel is not flat. This may allow bulges or depressions in the finished envelope surface that would be impractical to achieve with the simpler three-panel construction, but it comes with an increase in manufacturing cost and complexity. Another alternative structure may include a "belly" panel of stiffer material, located between the side panels along seam 430; this may provide stronger attachment points for bridle attachment or load suspension. Nevertheless, the three-panel arrangement shown here is the currently-preferred construction.

It is appreciated that flat intersections between two panels can be formed accurately and inexpensively, but intersections between three or more panels usually require reinforcement and more-complicated joining techniques. The arrangements described here relax that requirement, allowing three-panel envelopes to be made with two-panel techniques. Furthermore, the flat fabrication matrix allows easy and accurate placement of fins and stabilization structures, as described below.

Figure 7:
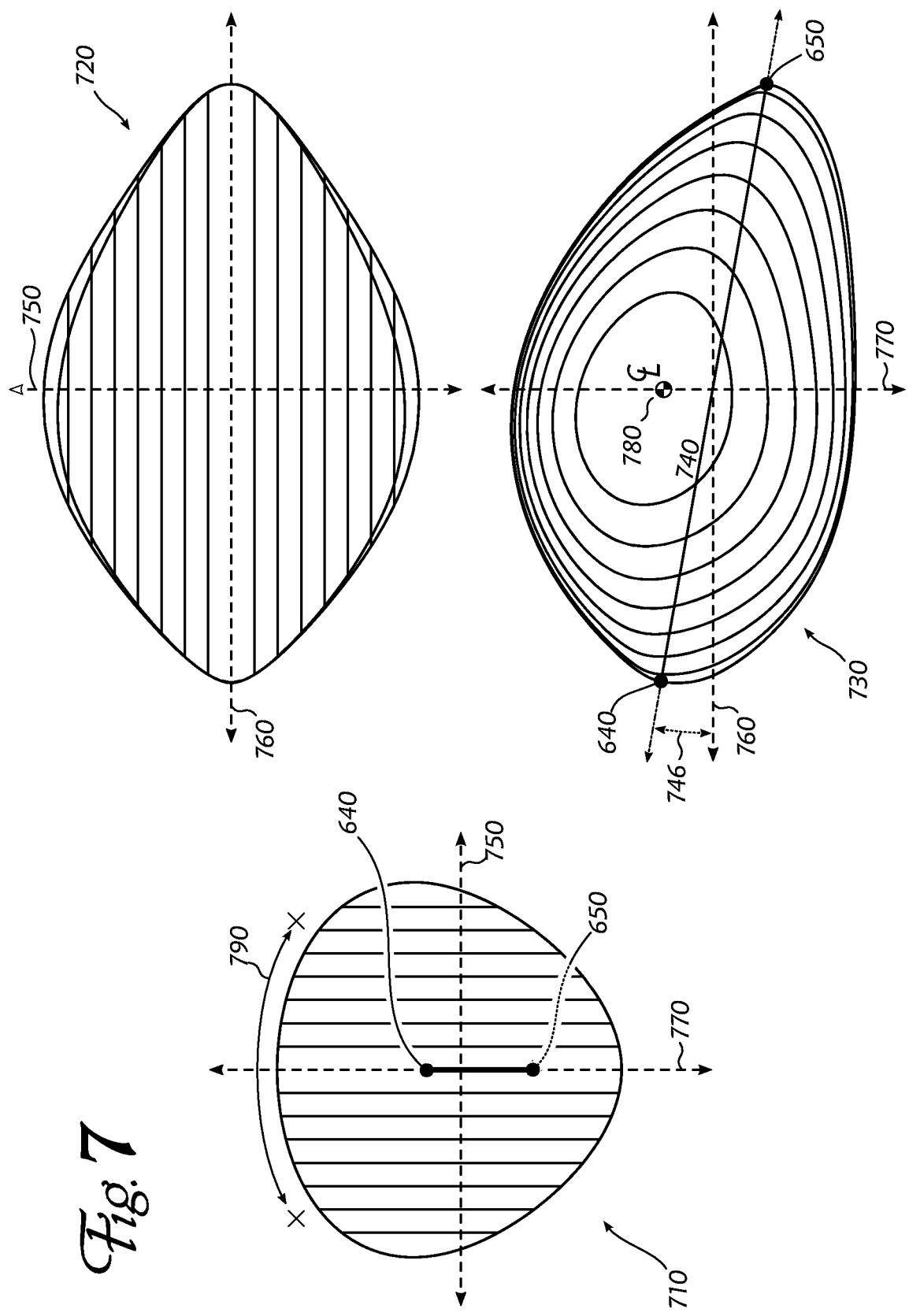
FIG. 7 shows example contours of front, top and side views of an inflatable envelope.

FIG. 7 shows front, top and side views of the inflatable envelope of an embodiment (710, 720 and 730, respectively). The seams have been omitted, and instead, contour lines indicate the general shape of the lifting body. A reference centerline, best seen at 740, connects the nose 640 and tail 650 points that were identified in FIG. 6. It should be appreciated that this line does not necessarily coincide with the lifting body's angle of attack—the bridle and tail system described below may hold the envelope at a different angle to the airstream.

Points on the envelope may be identified by reference to a Cartesian coordinate system, where the x axis 750 relates to left or right on the envelope; y axis 760 corresponds to front and back; and z axis 770 corresponds to up and down (above and below) the envelope. The z axis may usefully be located to pass through the center of aerostatic lift 780. Typically, the line passing through the nose 640 and tail 650 points is inclined at an angle 746 to the horizontal y axis 760 and the x-y plane. Arc 790 indicates a portion of the front silhouette where the top panel 620 lies. It is appreciated that the top panel narrows to a point at the nose and tail points 640, 650, where it joins with the side panels.

This figure shows that the envelope has mirror symmetry across the x-z plane (front view 710) and the y-z plane (top view 720). The side view 730 is asymmetrical, with a complex "airfoil" shape. This shape delivers a portion of the aerodynamic lift that holds the kite-balloon aloft in a breeze. This shape distinguishes the envelope of an embodiment from the more regular spherical, oblate spherical and lenticular balloons of the prior art.

Referring briefly to FIG. 1, recall that an embodiment 100 comprises the inflatable envelope 110 whose construction and shape have been described, as well as side wings 120 and a stabilizer or tail structure 130. These latter structures will be described next.

Figure 8:
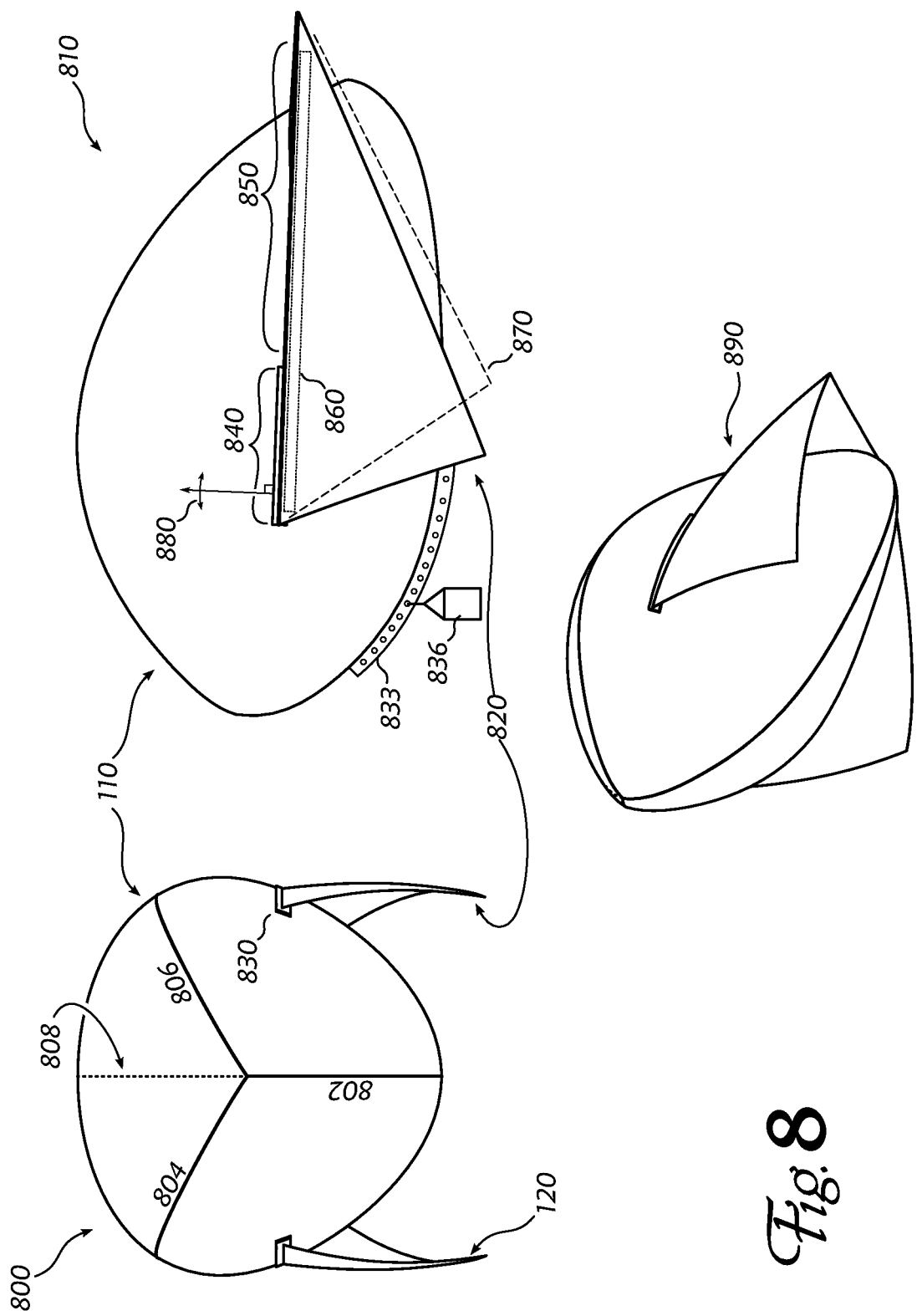
FIG. 8 shows details of "wings" or keels that may be used with an embodiment.

Turning to FIG. 8, a front view 800 and a side view 810 of an embodiment are presented. (There is also a smaller bottom isometric view 890 for reference.) The seam between the lower/side panels is visible in the front view at 802, while the seams between the top panel and the right and left side panels, respectively, are at 804 and 806. Dashed line 808 indicates where the top panel was folded during envelope manufacture. The three panels together form the previously-described inflatable envelope, but this Figure also shows the left and right triangular "wings" 120 and 820. Although the wings are shown with a curved profile, they may be made from a flat sheet and attached flat following sealing of the envelope. Such wings will naturally curve in the manner shown when the kite is inflated and flown, similarly to the single-skin ram-air kites designed by Rogallo in the 1970s. These wings may be made either from the same sheet material as the envelope or another material.

The wings are secured to the envelope by a coupler 830, which supports part of the triangular edge of the wing 840. A further portion of that edge 850 is not secured to the envelope, but may instead be supported by a spar 860, such as a graphite, carbon fiber, fiberglass or other strong, flexible member, which may, for example, be inserted into a pocket along the edge of the wing 820. In some embodiments, an inflated or ram-air structure may provide support for the side wings, instead of a solid spar—see FIG. 12 at 1260.

The angle of attack of the lifting-body envelope may be adjusted by changing the shape of the triangular wing (as indicated by dashed lines 870) or by changing the angle 880 at which coupler 830 is secured to envelope 110. (Typically, coupler 830 is attached parallel to the x axis shown at 760 in FIG. 7.) In one embodiment, coupler 830 may be an adhesive or thermoactivated seam between an envelope side panel and a portion of the wing. In another embodiment, one half of a zipper may be secured to the envelope, and a corresponding half zipper may be provided to attach the wing to the envelope. In another embodiment, mating pieces of hook-and-loop fabric may be used to couple the wing to the envelope. In such an embodiment, the wing attachment angle can be easily adjusted to suit wind conditions. It is appreciated that coupler 830 may be installed on the envelope accurately if this manufacturing operation is carried out when the envelope is still flat (e.g., FIG. 4), either before or after seaming the flat sheet material.

The desired flight angle under wind load is nose up, which is similar to the "natural" unloaded free-flight angle of the envelope without fins or wings. The payload 836 is balanced against wing mass so that the payload-weighted angle matches the desired flight angle. The flight angles of an embodiment under different loads and wind conditions are aligned to assure a tendency towards stability amidst transitions in wind load. An embodiment may comprise a plurality of load-attachment points 833 along the centerline of the belly (the lower seam between the two side panels) so that the load 836 can be moved fore or aft to help achieve the target flight angle.

The use of side wings (or double keels) eliminates most bridle rigging and opens up the belly of the balloon for direct payload attachment. Payload balancing is easier because the load need only be moved fore and aft along the centerline of the belly (which is marked, in many embodiments, by an easily-visible seam). Together, these features eliminate the complex and fussy multi-line rigging needed for other kite and kite-balloon configurations.

Figure 9:
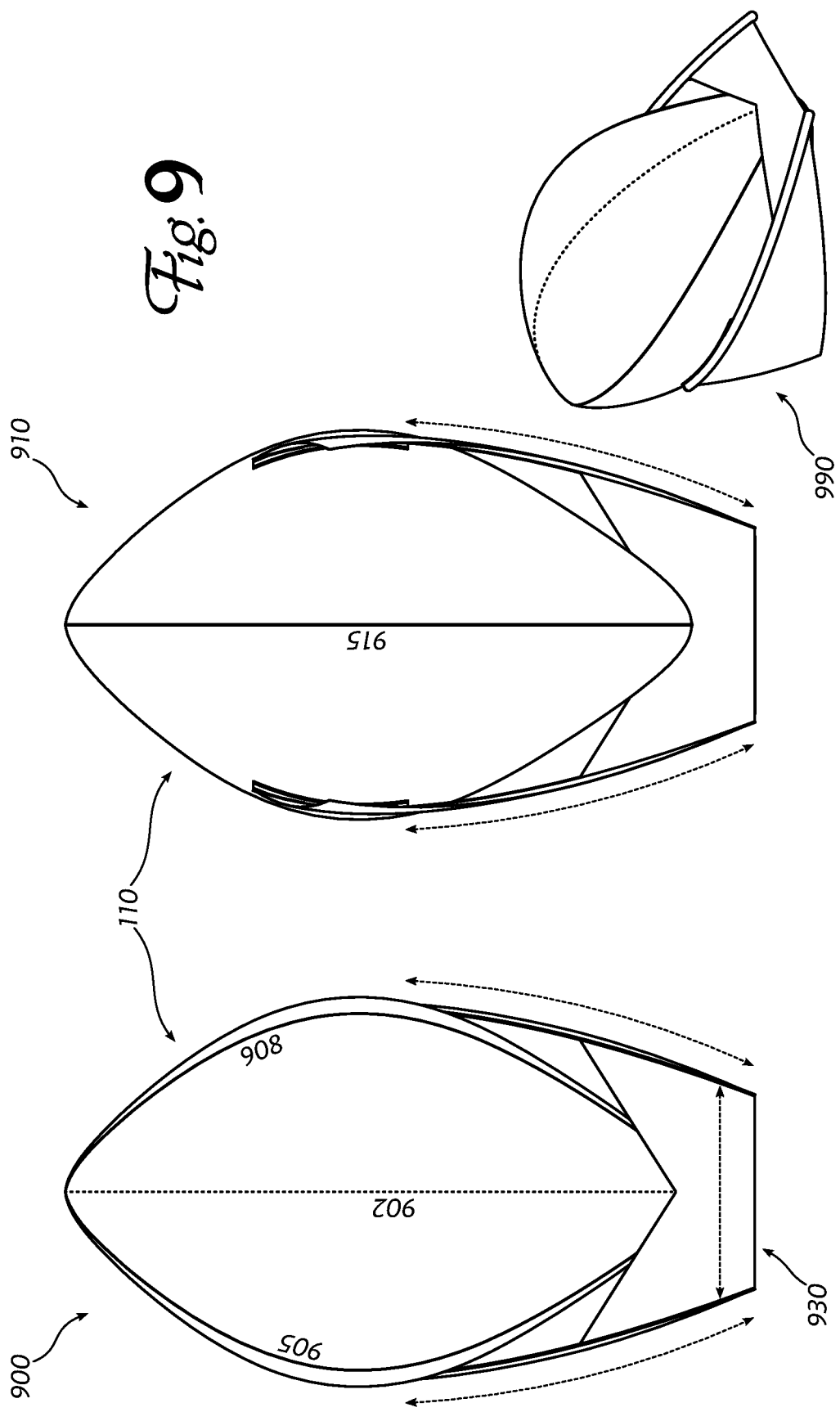
FIG. 9 shows details of a horizontal stabilizer or "tail" that may be used with an embodiment.

Finally, FIG. 9 shows another portion of an embodiment, the horizontal stabilizer or tail. Top and bottom views of an embodiment (900, 910) show the tail surface 930. A small isometric rear view is included at 990. The tail may be made of the same sheet material as the envelope 110 and/or the wings (wings not clearly visible in the main top and bottom views, but visible in the isometric detail). In this case, the material is held in tension between the spars (FIG. 8, 860, also indicated in this Figure by curved, dashed, double-headed arrows). In another embodiment, the tail surface may be a rigid material such as Styrofoam, plastic or fiberglass. The dashed centerline 902 in top view 900 indicates where the top panel may have been folded during fabrication. The left and right top envelope seams are just visible at 905 and 908. In the bottom view 910, the bottom centerline (seam between left and right side panels) is indicated by solid line 915. The horizontal stabilizer helps maintain the angle of attack of the lifting body.

Figure 10:
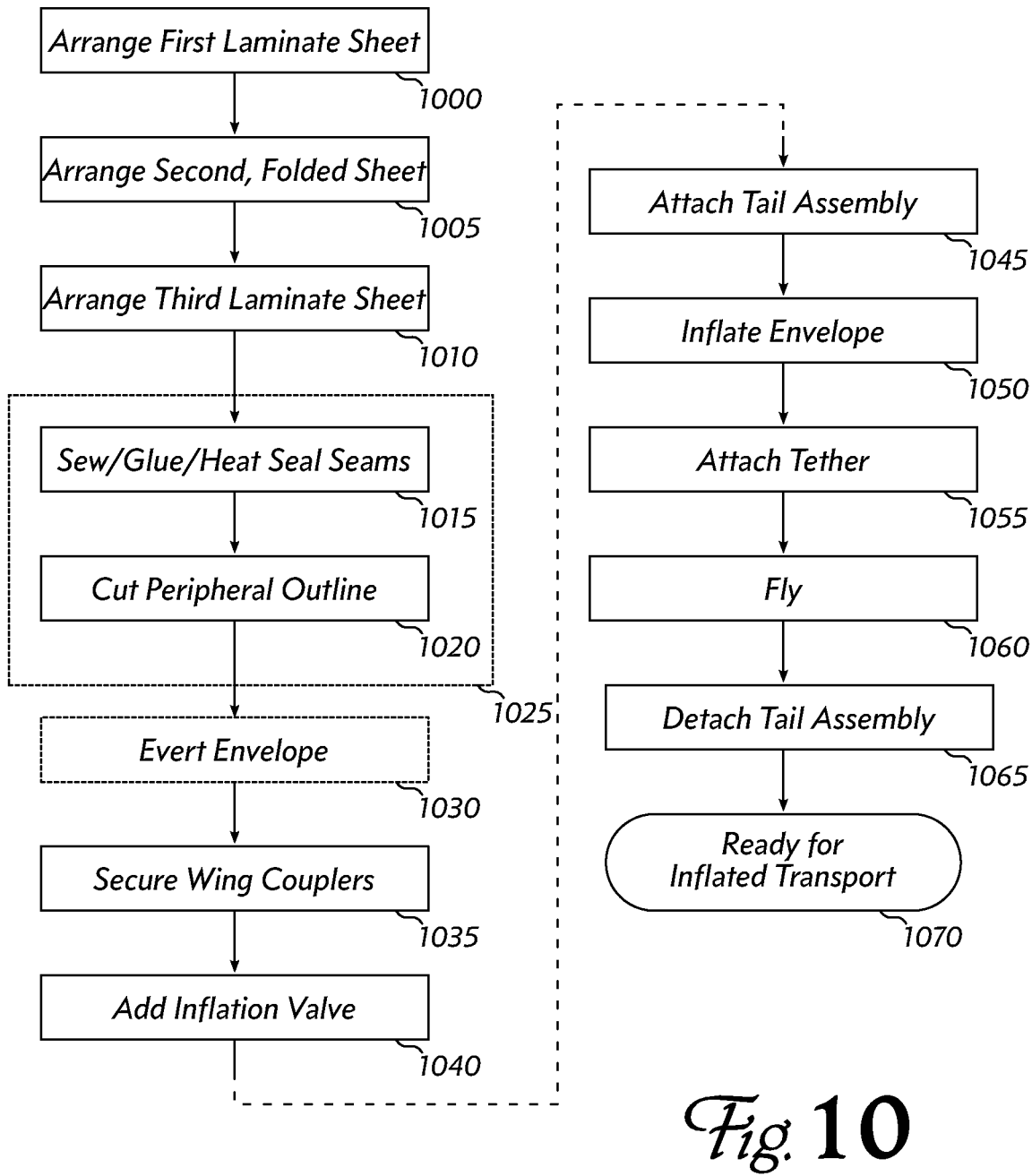
FIG. 10 outlines a method for manufacturing an embodiment and assembling it for use.

FIG. 10 outlines a method of manufacture and use of an embodiment. A first sheet of material is arranged on a workspace (1000). Next, a second, folded sheet of material is arranged adjacent the first sheet (1005). The fold line of the second sheet may run from a nose point to a tail point, as discussed in relation to FIG. 6. Then a third sheet of material is arranged adjacent the second, folded sheet (1010), to form a fabrication matrix or laminate.

Next, the seams between adjacent layers of the fabrication laminate are formed by sewing, gluing, heat sealing or by a similar technique (1015). If the seaming process does not cut away excess scrap material, then the fabrication laminate is cut around a perimeter or peripheral outline (1020). In one preferred manufacturing process, the fusing and cutting steps are performed together (1025).

In some embodiments, the cut and joined envelope may be everted (1030) to move the seam allowances inside the envelope. Then, wing couplers are secured to the outside of the envelope (1035). Some embodiments self-inflate and maintain inflation by means of ram-air, while others are manually inflated. For the latter type, an inflation valve is added to the envelope (1040). This completes the principal manufacturing tasks, although other steps may also be taken. For example, the envelope may be printed, painted or otherwise decorated; and additional attachment points may be secured to the exterior.

When the lifting-body kite is to be flown, the tail structure is attached (1045) and envelope is inflated (1050). (If the wings are not permanently secured to the envelope, these must be attached as well.) Then, a tether or bridle is attached (1055) and the apparatus is ready to fly (1060). After flight, the tail assembly may be removed (1065), but the envelope need not be deflated before transport (1070).

Figure 11:
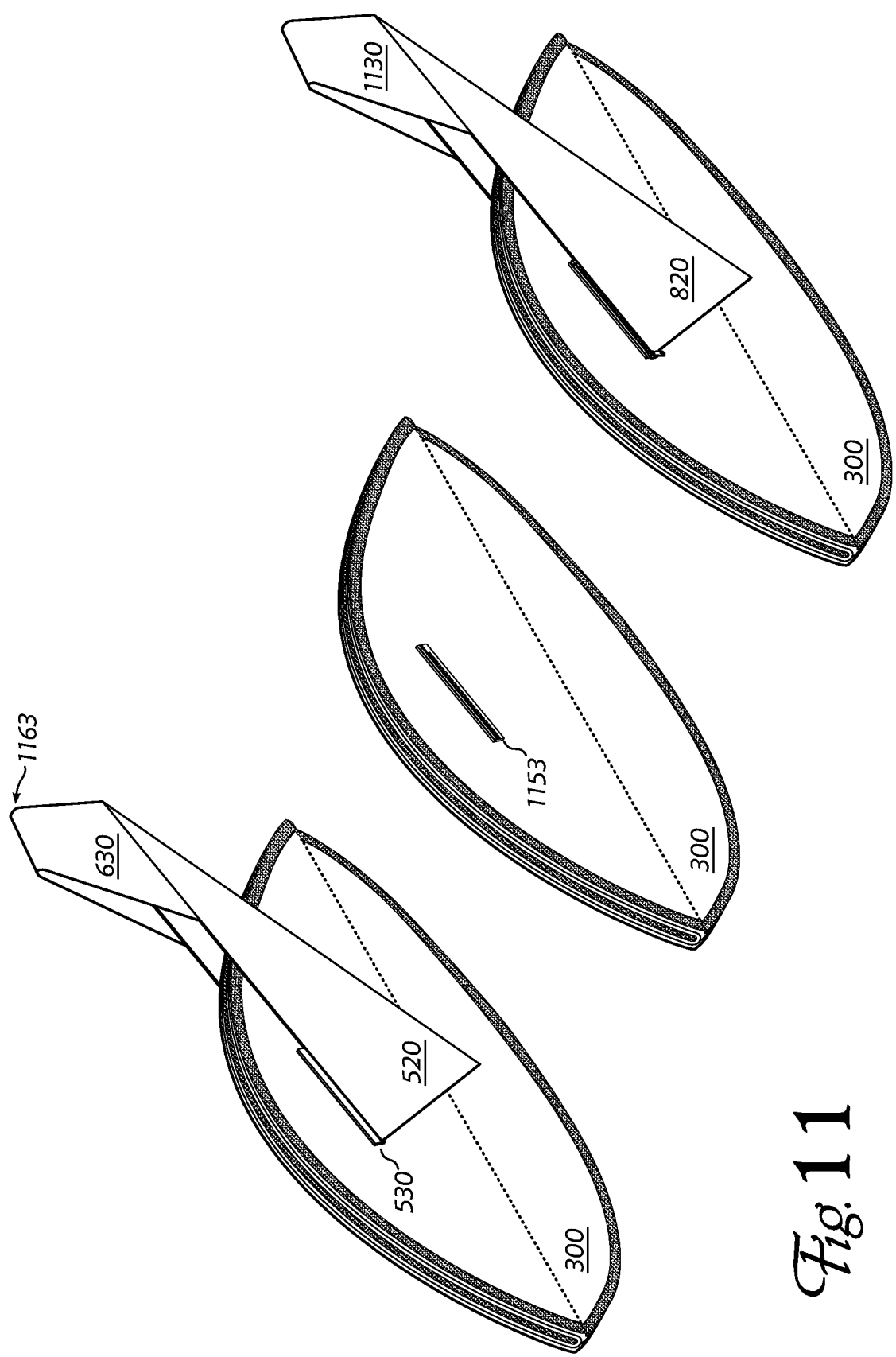
FIG. 11 shows some alternate horizontal stabilizer or tail configurations.

FIG. 11 shows an alternate horizontal-stabilizer arrangement. The inflatable envelope is shown in its flat configuration during manufacturing; the side wings 520 can be affixed directly via coupler 530 with tail 630 folded in half, 1163. Or one half of a zipper 1153 can be affixed to the side of the inflatable envelope, and side wings 820 and tail 1130 can be attached later.

FIG. 12 shows an embodiment 1200 which uses inflatable, ram-air channels 1260 to support the side wings and tail. An embodiment 1210 may include further stabilizing or attitude-control surfaces such as fins 1230 at each end of the tail structure.

The applications of the present invention have been described largely by reference to specific examples and in terms of particular shapes, sizes and arrangement of components. However, those of skill in the art will recognize that inflatable lifting-body kites having the inventive features can also be constructed differently than herein described. Such variations and alternate constructions are understood to be captured according to the following claims.

We claim:

1. An inflatable lifting body comprising:
   two side panels having approximately identical peripheral boundary shapes and mirror image surface profiles; and
   a top panel having a bilaterally-symmetric shape so that its peripheral boundary includes two mirror-image half-boundaries, wherein
   the two side panels are joined together along a lower portion of their peripheral boundary shapes, and
   each side panel is joined along an upper portion of its peripheral boundary shape to one of the two mirror-image half-boundaries of the top panel, and wherein
   the two side panels and the top panel come together at a front point and a rear point of the inflatable lifting body, the front point and the rear point thus defining a reference centerline.

2. The inflatable lifting body of claim 1, further comprising:
an inflation valve.

3. The inflatable lifting body of claim 1 wherein at least one panel of the two side panels and the top panel is formed from a plurality of sub-panels joined together.

4. The inflatable lifting body of claim 1 wherein each of the two side panels and the top panel is formed as a single piece of sheet material.

5. The inflatable lifting body of claim 1 wherein both of the side panels and the top panel develop a convex surface profile when an internal pressure of the inflatable lifting body exceeds an ambient pressure.

6. The inflatable lifting body of claim 1, further comprising:
a first keel affixed to one of the two side panels; and
a second keel affixed to another of the two side panels.

7. The inflatable lifting body of claim 1, further comprising:
a horizontal stabilizer coupled to the inflatable lifting body.

8. The inflatable lifting body of claim 1 wherein both of the side panels and the top panel are formed from a sheet material chosen from the group consisting of:
thermoplastic polyurethane ("TPU"),
polyester film, and
woven nylon fabric.

9. An inflatable shaped lifting-body kite, comprising:
a multi-gore inflatable lifting body;
a left-side keel coupled to the multi-gore inflatable lifting body;
a right-side keel coupled to the multi-gore inflatable lifting body; and
a tail coupled to the multi-gore inflatable lifting body, wherein the multi-gore inflatable lifting body comprises:
a lower-left side gore having a lower-left asymmetrical lenticular shape;
a lower-right side gore having a lower-right asymmetrical lenticular shape similar to the lower-left asymmetrical lenticular shape; and
a top gore having a bilaterally-symmetrical top lenticular shape, wherein
the lower-left side gore is secured to the lower-right side gore along approximately a first half of a perimeter of their similar asymmetrical lenticular shapes,
the lower-left side gore is secured to one edge of the top gore along approximately a second half of the perimeter of the lower-left asymmetrical lenticular shape and a first half of a perimeter of the top lenticular shape, and
the lower-right side gore is secured to another edge of the top gore along approximately a second half of the perimeter of the lower-right asymmetrical lenticular shape and a second half of the perimeter of the top lenticular shape.

10. The inflatable shaped lifting-body kite of claim 9 wherein the lower-left side gore, the lower-right side gore and the top gore are formed from thermoplastic polyurethane ("TPU").

11. The inflatable shaped lifting-body kite of claim 9 wherein the lower-left side gore, the lower-right side gore and the top gore are formed from polyester film.

12. The inflatable shaped lifting-body kite of claim 9 wherein the left-side keel and the right-side keel are formed of a same material as the lower-left side gore.

13. The inflatable shaped lifting-body kite of claim 9 wherein the left-side keel and the right-side keel are coupled to the multi-gore inflatable lifting body by a coupler chosen from the group consisting of:
an adhesive seam between each keel and a corresponding side gore;
a thermoactivated seam between each keel and a corresponding side gore;
a half zipper secured to each side gore and a corresponding half zipper provided to each keel; and
mating pieces of hook-and-loop fabric affixed to each keel and a corresponding side gore.

14. A method of manufacturing an inflatable lifting body having a leading point and a trailing point, comprising:
placing a first material ply on a working surface;
placing a second material ply having a fold line adjacent the first material ply, said fold line extending across the first material ply;
placing a third material ply adjacent the first material ply and the second material ply to form a multi-layer fabrication laminate; and
cutting an asymmetrical lenticular shape through the multi-layer fabrication laminate to form three shaped gores.

15. The method of manufacture of claim 14, wherein the cutting operation joins adjacent material plies to form seams around portions of peripheral edges of the three shaped gores.

16. The method of manufacture of claim 14, further comprising:
joining edges of adjacent plies by sewing, gluing or heat sealing.

17. The method of manufacture of claim 14, further comprising:
installing a valve to permit inflation of the inflatable lifting body.

18. The method of manufacture of claim 14, further comprising:
everting the material plies so that seams between adjacent plies are contained inside an envelope of the inflatable lifting body.

19. The method of manufacture of claim 14, further comprising:
joining a left keel to the first material ply; and
joining a right keel to the third material ply.

* * * * *